US012153356B2

(12) United States Patent
Onishi et al.

(10) Patent No.: US 12,153,356 B2
(45) Date of Patent: Nov. 26, 2024

(54) IMAGE FORMING APPARATUS

(71) Applicant: TOSHIBA TEC KABUSHIKI KAISHA, Tokyo (JP)

(72) Inventors: Kei Onishi, Sunto Shizuoka (JP); Daisuke Yamashita, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/732,660

(22) Filed: Apr. 29, 2022

(65) Prior Publication Data

US 2023/0350323 A1 Nov. 2, 2023

(51) Int. Cl.
*G03G 15/08* (2006.01)
*G03G 15/06* (2006.01)
*G03G 15/09* (2006.01)

(52) U.S. Cl.
CPC ....... *G03G 15/0812* (2013.01); *G03G 15/065* (2013.01); *G03G 15/0808* (2013.01); *G03G 15/0921* (2013.01)

(58) Field of Classification Search
CPC ........... G03G 15/0812; G03G 15/0808; G03G 15/0921
See application file for complete search history.

(56) References Cited

U.S. PATENT DOCUMENTS 10,627,744 B1 * 4/2020 Hayashi ............... G03G 15/095
2013/0188973 A1 * 7/2013 Kusumoto ......... G03G 15/0893 399/27
2016/0306292 A1 * 10/2016 Tauchi ................. G03G 15/065
2018/0181052 A1 * 6/2018 Hamakawa ........ G03G 15/0921
2018/0348698 A1 * 12/2018 Tamaki ............. G03G 21/1676

FOREIGN PATENT DOCUMENTS

JP 2009-258276 11/2009
JP 2010-085713 4/2010
JP 2014-240890 12/2014

* cited by examiner

*Primary Examiner* — Jessica L Eley
(74) *Attorney, Agent, or Firm* — Amin, Turocy & Watson, LLP

(57) ABSTRACT

An image forming apparatus includes a developing roller, a developing motor, a blade, and a controller. The developing roller includes a sleeve configured to carry a developer that is supplied to an electrostatic latent image held by an image carrier. The developing motor is configured to rotate the sleeve in any one of a first direction or a second direction opposite to the first direction. The blade is configured to regulate a thickness of a layer of the developer that is carried by the sleeve rotating in the first direction with the developing motor. The controller is configured to rotate the sleeve in the second direction with the developing motor until a surface of the sleeve present in a peel-off region of the developer arrives at a facing position facing the blade after development on the electrostatic latent image held by the image carrier ends.

15 Claims, 8 Drawing Sheets

IMAGE FORMING APPARATUS

FIELD

Embodiments described herein relate generally to an image forming apparatus, a developing device, and a method related thereto.

BACKGROUND

In the related art, an electrophotographic image forming apparatus includes a developing unit for supplying a developer to an electrostatic latent image on a photoconductive drum. The developing unit includes a developing roller where a plurality of magnetic poles are disposed. The developing roller includes a sleeve that carries the developer that is supplied to the electrostatic latent image on the photoconductive drum. The sleeve of the developing roller rotates with a developing motor. The thickness of a layer of the developer that is carried by the sleeve rotating in a normal direction is regulated by a blade in front of the photoconductive drum.

In the image forming apparatus in the related art, if the developing motor is stopped, a large amount of the developer remains in the vicinity of the blade facing the sleeve in the developing unit. The developer remaining in the gap between the sleeve and the blade may be solidified by a temperature increase in the image forming apparatus, stress generated by a magnetic force, and the like. In the electrophotographic image forming apparatus, it is necessary to prevent the developer in the developing unit from being solidified.

DETAILED DESCRIPTION

In general, according to one embodiment, an image forming apparatus includes a developing roller, a developing motor, a blade, and a controller. The developing roller includes a sleeve configured to carry a developer that is supplied to an electrostatic latent image held by an image carrier. The developing motor is configured to rotate the sleeve in any one of a first direction or a second direction opposite to the first direction. The blade is configured to regulate a thickness of a layer of the developer that is carried by the sleeve rotating in the first direction with the developing motor. The controller is configured to rotate the sleeve in the second direction with the developing motor until a surface of the sleeve present in a peel-off region of the developer arrives at a facing position facing the blade after development on the electrostatic latent image held by the image carrier ends.

Hereinafter, an embodiment will be described with reference to the drawings.

First, a configuration of a digital multi-functional peripheral (MFP) 1 as an image forming apparatus according to the embodiment will be described.

Figure 1:
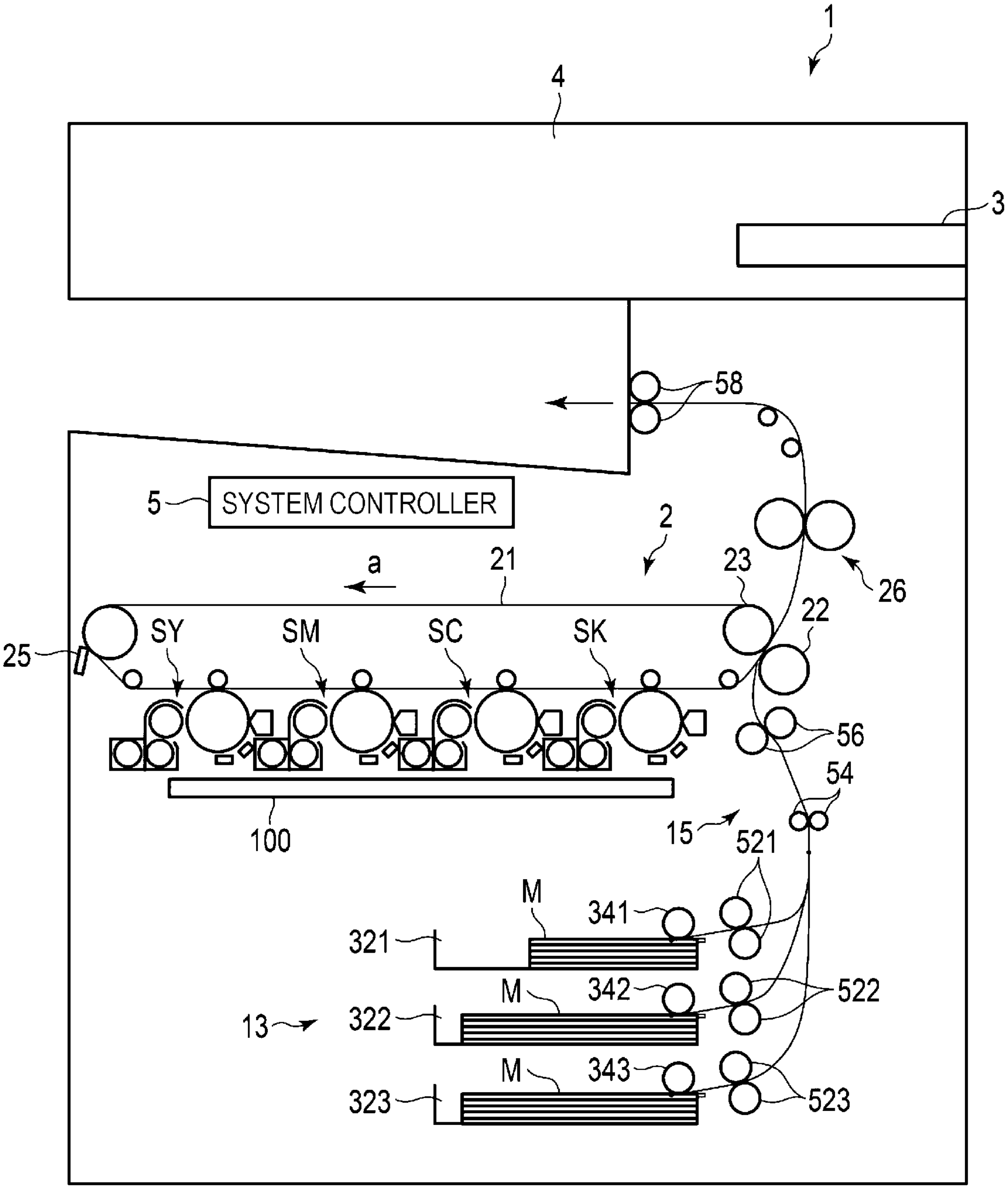
FIG. 1 is a diagram illustrating a configuration example of a digital multi-functional peripheral as an image forming apparatus according to an embodiment.

FIG. 1 is a block diagram illustrating a configuration example of the digital multi-functional peripheral 1 as the image forming apparatus according to the embodiment.

As illustrated in FIG. 1, the digital multi-functional peripheral 1 includes a printer 2, an operation panel 3, a scanner 4, and a system controller 5.

The printer 2 is an image forming apparatus that forms an image on a recording medium. The printer 2 in the digital multi-functional peripheral 1 is an image forming apparatus that forms an image on a recording medium using an electrophotographic method. The printer 2 forms an image (toner image) on a recording medium such as paper with toner. The recording medium on which the printer 2 forms an image is not limited to paper as long as it is a medium on which an image can be formed, and may be cloth, a plastic film, or a sheet.

The scanner 4 is provided in a main body upper portion of the digital multi-functional peripheral 1. The scanner 4 is a device that optically reads an image of a document. For example, the scanner 4 reads an image of a document set on a document table glass. In addition, the scanner 4 may also be configured to read an image of a document that is conveyed by an automatic document feeder (ADF).

The operation panel 3 is a user interface. The operation panel 3 includes a display unit (display), a touch panel, and an operation button. The operation panel 3 displays an operation guide or the like on the display unit. The operation panel 3 receives an operation instruction from a user through the touch panel, the operation button, and the like. For example, in the operation panel 3, the touch panel is provided on a display screen of the display unit, and a portion that is touched by the user on the display screen of the display unit is detected.

The system controller 5 controls the entire digital multi-functional peripheral 1. The system controller 5 receives an operation instruction input from the operation panel 3 and controls an operation of each of the units. In addition, the system controller 5 receives an operation instruction from an external apparatus connected via an interface and controls the operation of each of the units. For example, if an instruction to form an image on a recording medium is received, the system controller 5 controls the printer 2 such that the printer 2 forms the image on the recording medium.

Hereinafter, a configuration of the printer 2 will be described.

As illustrated in FIG. 1, the printer 2 includes a medium supply mechanism 13, a conveyance mechanism 15, a plurality of image forming stations SY, SM, SC, and SK, an intermediate transfer belt 21, a secondary transfer roller 22, a support roller 23, a transfer belt cleaner 25, and a fixing unit 26.

The medium supply mechanism 13 includes a plurality of paper feed cassettes 321, 322, and 323. The number of paper feed cassettes may be any number. Each of the paper feed cassettes 321, 322, and 323 accommodates paper as a recording medium M. The paper feed cassettes may accommodate paper of different sizes or different types as the recording medium M. In the paper feed cassettes 321, 322, and 323, pickup rollers 341, 342, and 343 are disposed, respectively. The pickup rollers 341, 342, and 343 pick up the paper as the recording mediums one by one from the paper feed cassettes 321, 322, and 323, respectively. The pickup rollers 341, 342, and 343 supply the picked recording medium M to the conveyance mechanism 15.

The conveyance mechanism 15 conveys the recording medium M. The conveyance mechanism 15 includes first conveying rollers 521, 522, and 523, a second conveying roller 54, and a registration roller 56 on a conveyance path before image formation on the recording medium M. The conveyance mechanism 15 conveys the recording medium M supplied by the pickup rollers 341, 342, and 343 from the first conveying rollers 521, 522, and 523 to the second conveying roller 54. In the conveyance mechanism 15, the second conveying roller 54 further conveys the recording medium M to the registration roller 56.

The registration roller 56 of the conveyance mechanism 15 conveys the recording medium M to a secondary transfer position described below at a timing at which the image is transferred from the intermediate transfer belt 21 to the recording medium M at the secondary transfer position. The conveyance mechanism 15 configures the conveyance path such that the recording medium M to which the image is transferred from the intermediate transfer belt 21 is conveyed to the fixing unit 26. The conveyance mechanism 15 further includes a third conveying roller 58 for discharging paper to a paper discharge unit and a conveyance mechanism that conveys the recording medium M to a reversing unit for reversing the recording medium M.

Each of the image forming stations SY, SM, SC, and SK forms an image with toner. In the embodiment, the image forming station SY forms a yellow image. The image forming station SM forms a magenta image. The image forming station SC forms a cyan image. The image forming station SK forms a black image. Each of the image forming stations SY, SM, SC, and SK transfers the image formed with the toner to the intermediate transfer belt 21.

The intermediate transfer belt 21 is a medium that holds the images transferred by the image forming stations SY, SM, SC, and SK. The intermediate transfer belt 21 is an endless belt as illustrated in FIG. 1. The intermediate transfer belt 21 moves in a direction indicated by arrow a in FIG. 1. The intermediate transfer belt 21 moves the image transferred by each of the image forming stations SY, SM, SC, and SK to a position where the secondary transfer roller 22 and the support roller 23 face each other.

The secondary transfer roller 22 and the support roller 23 configure a transfer unit (secondary transfer unit) that transfers the image from the intermediate transfer belt 21 to the recording medium. The position where the secondary transfer roller 22 and the support roller 23 face each other is the secondary transfer position where the image is transferred from the intermediate transfer belt 21 to the recording medium. At the secondary transfer position, the intermediate transfer belt 21 and the recording medium are interposed between the secondary transfer roller 22 and the support roller 23.

The support roller 23 supports the intermediate transfer belt 21. The support roller 23 is a driving roller that drives the intermediate transfer belt 21. The secondary transfer roller 22 faces the support roller 23 with the intermediate transfer belt 21 interposed therebetween. The secondary transfer roller 22 transfers (secondary transfer) the image formed with the toner on the transfer surface of the intermediate transfer belt 21 to a surface of the recording medium.

As illustrated in FIG. 1, the transfer belt cleaner 25 is disposed between the secondary transfer position and a primary transfer position in the moving direction a of the intermediate transfer belt 21. The transfer belt cleaner 25 removes toner on the intermediate transfer belt 21. For example, the transfer belt cleaner 25 removes toner remaining on the transfer surface of the intermediate transfer belt 21 after the image is transferred from the intermediate transfer belt 21 to the recording medium.

The fixing unit 26 fixes the image formed with toner transferred to the recording medium to the recording medium. The fixing unit 26 is disposed on a conveyance path of the recording medium after passing the secondary transfer position. The fixing unit 26 includes a pressurization roller and a heating roller facing each other. The fixing unit 26 applies heat and pressure to the recording medium when being conveyed between the heating roller and the pressurization roller facing each other. The fixing unit 26 fixes the toner image transferred to the recording medium by heating the recording medium in a state where the recording medium is pressurized.

Next, a configuration of each of the image forming stations SY, SM, SC, and SK in the printer 2 as the image forming apparatus according to the embodiment will be described in detail.

Figure 2:
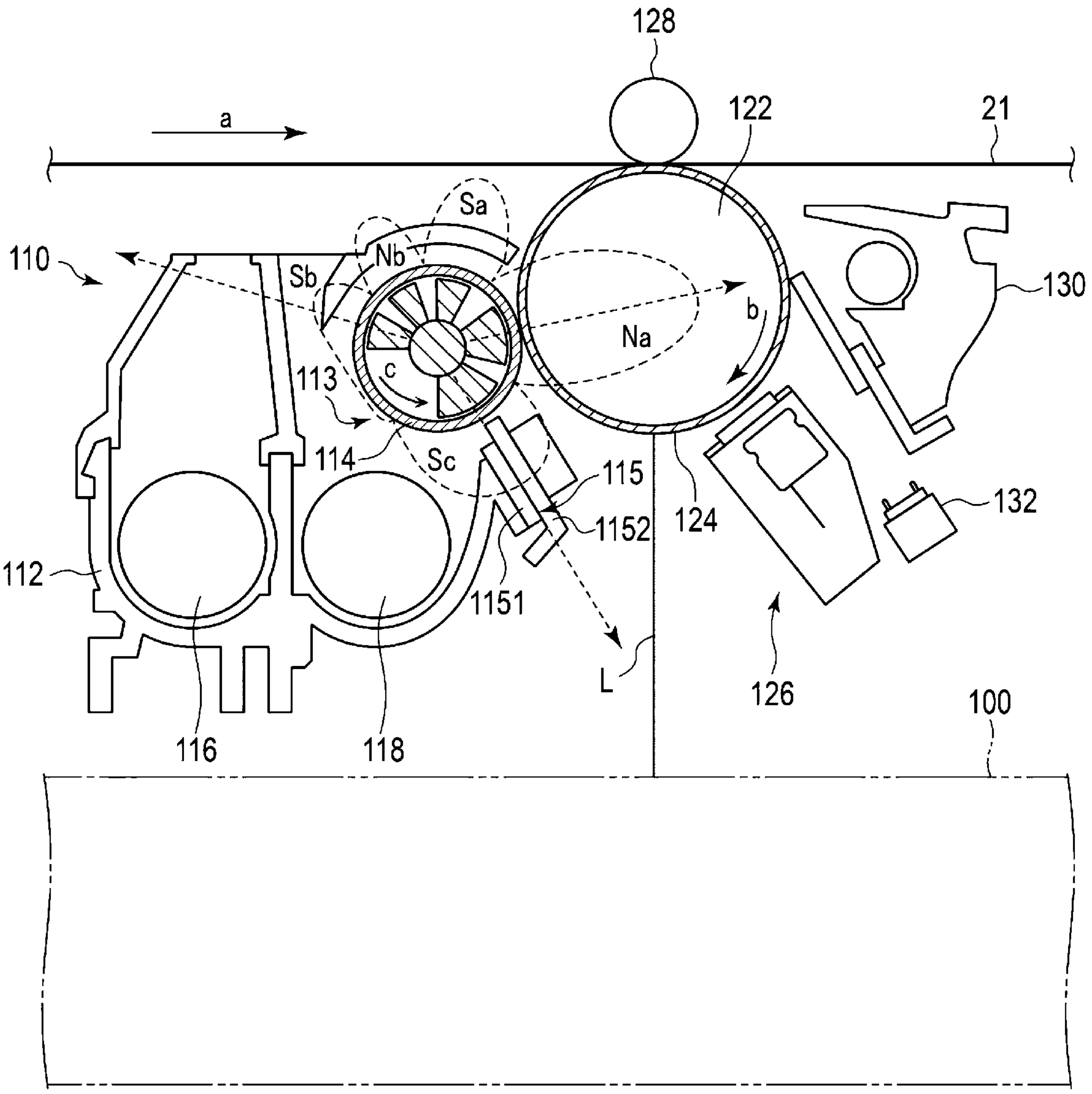
FIG. 2 is a diagram illustrating a configuration example of a periphery of a developing unit in a printer of the digital multi-functional peripheral as the image forming apparatus.

FIG. 2 is a diagram illustrating a configuration example of each of the image forming stations SY, SM, SC, and SK in the printer 2.

As illustrated in FIG. 2, each of the image forming stations SY, SM, SC, and SK includes an exposure unit 100, a developing unit 110, a photoconductive drum 122, a charging unit 126, a primary transfer roller 128, a photoreceptor cleaner 130, and a charge eraser 132. In the embodiment, each of the image forming stations SY, SM, SC, and SK has the configuration shown in FIG. 2.

The photoconductive drum 122 is an image carrier including a photoreceptor layer 124 on a surface. The photoconductive drum 122 rotates in a direction (direction indicated by arrow b in FIG. 2) together with the movement of the intermediate transfer belt 21 in the moving direction a. In the vicinity of the photoconductive drum 122, the charging unit 126, the exposure unit 100, the developing unit 110, the primary transfer roller 128, the intermediate transfer belt 21, the photoreceptor cleaner 130, and the charge eraser 132 are disposed.

The charging unit 126 uniformly charges the photoreceptor layer 124 on the surface of the photoconductive drum 122. For example, the charging unit 126 uniformly charges the photoreceptor layer 124 on the surface of the photoconductive drum 122 such that the photoreceptor layer 124 has negative polarity.

The exposure unit 100 forms an electrostatic pattern (electrostatic latent image) corresponding to the image on the surface of the photoconductive drum 122. The exposure unit 100 irradiates the surface of the photoconductive drum 122 with light L of which emission is controlled based on image data. For example, the exposure unit 100 irradiates the surface of the photoconductive drum 122 with the light L emitted based on image data through an optical system such as a polygon mirror. The exposure unit 100 may be configured to include a device that emits a plurality of laser light guided to the photoconductive drums 122 of the plurality of image forming stations. In addition, the exposure unit 100 may be a light emitting device provided in each of the plurality of image forming stations.

The developing unit 110 develops the electrostatic latent image formed on the surface of the photoconductive drum 122 with a developer. The developing unit 110 supplies the developer to the surface of the photoconductive drum 122 that is exposed by the exposure unit 100. The developing unit 110 of each of the image forming stations develops the image with the color corresponding thereto. For example, the developing unit 110 of the image forming station SY develops the electrostatic latent image on the photoconductive drum 122 with the yellow toner. The developing unit 110 of the image forming station SM develops the electrostatic latent image on the photoconductive drum 122 with the magenta toner. The developing unit 110 of the image forming station SC develops the electrostatic latent image on the photoconductive drum 122 with the cyan toner. The developing unit 110 of the image forming station SK develops the electrostatic latent image on the photoconductive drum 122 with the black toner.

In the configuration example illustrated in FIG. 2, the developing unit 110 includes a developer container 112, a developing roller 113, a blade 115, a first mixer 116, and a second mixer 118.

The developer container 112 is a container containing the developer. The developer is a mixture of the toner and a carrier formed of magnetic fine particles. If the developer is stirred, the toner is triboelectrically charged. As a result, the toner is attached to the surface of the carrier due to an electrostatic force. In addition, a toner density sensor is disposed in the developer container 112. The system controller 5 controls a toner density detected by the toner density sensor.

The developing roller 113 includes a magnet roller including a magnetic material (for example, a magnet) for forming a plurality of magnetic pole regions. In addition, the developing roller 113 includes a sleeve 114 that rotates with a developing motor 111 (refer to FIG. 3). If the electrostatic latent image held by the photoconductive drum 122 on the surface is developed, the sleeve 114 of the developing roller 113 rotates in a counterclockwise direction (direction indicated by arrow c in FIG. 2). Hereinafter, regarding the rotation of the sleeve 114, rotation in the counterclockwise direction (direction indicated by arrow c in FIG. 2) will be referred to as "normal rotation", and rotation in a direction opposite to the direction of the normal rotation (arrow c) will be referred to as "reverse rotation".

The developing roller 113 is provided such that the plurality of magnetic poles are disposed along a circumference of the sleeve 114. In the developing roller 113, a region including a position (development position) where a surface of the sleeve 114 is adjacent to a surface of the photoconductive drum 122 will be referred to as "Na pole". In the configuration example illustrated in FIG. 2, in the developing roller 113, the Na pole, a Sa pole, a Nb pole, a Sb pole, and a Sc pole are disposed in this order in the normal rotation direction of the sleeve 114.

In the developing roller 113, the Sa pole is disposed next to the Na pole in the normal rotation direction of the sleeve 114. In the developing roller 113, the Nb pole is disposed next to the Sa pole in the normal rotation direction of the sleeve 114. In the developing roller 113, the Sb pole is disposed next to the Nb pole in the normal rotation direction of the sleeve 114. In the developing roller 113, the Sc pole is disposed next to the Sb pole in the normal rotation direction of the sleeve 114 (in front of the Na pole in the normal rotation direction of the sleeve 114).

The Na pole is a magnetic pole that supplies the developer carried by the sleeve 114 to the electrostatic latent image of the photoconductive drum 122. The Na pole will also be referred to as "development pole". The Sa pole and the Nb pole are magnetic poles that convey the developer remaining in the sleeve 114. The Sa pole and the Nb pole will also be referred to as "conveyance poles". The Sc pole is a magnetic pole that causes the developer to adsorb to the sleeve 114. The Sc pole will also be referred to as "adsorption pole of the developer" or "layer formation pole of the developer". The Sb pole is a magnetic pole that causes the developer to peel off from the sleeve 114 due to a repulsive magnetic force (peel force) generated between the Sb pole and the Sc pole and a centrifugal force. The Sb pole will also be referred to as "peel-off pole".

The blade 115 is disposed to face the sleeve 114 of the developing roller 113. The blade 115 has a gap with the surface of the sleeve 114 in the developing roller 113 to which the developer is attached. The blade 115 regulates a thickness of a layer of the developer attached to the sleeve 114 of the rotating developing roller 113. The developer that is carried by the sleeve 114 of the developing roller 113 moves to the position (development position) facing the surface of the photoconductive drum 122 in a state where the thickness is regulated by the blade 115.

The blade 115 illustrated in FIG. 2 is configured with a paramagnetic material 1151 and a non-magnetic material 1152. The blade 115 is provided to face the sleeve 114 in a state where a non-magnetic member and a paramagnetic member overlap each other. In addition, in the blade 115, the paramagnetic material 1151 is disposed more distant from the sleeve 114 of the developing roller 113 than the non-magnetic material 1152. For example, the paramagnetic material 1151 is disposed more distant from the surface of the sleeve 114 of the developing roller 113 by 0.2 mm or more than the non-magnetic material 1152. The blade 115 has a structure in which stress for regulating the developer attached to the sleeve 114 is suppressed by disposing the paramagnetic material 1151 more distant than the non-magnetic material 1152.

The first mixer 116 and the second mixer 118 stir the developer in the developer container 112. In addition, the first mixer 116 and the second mixer 118 convey the developer. The second mixer 118 disposed below the developing roller 113 supplies the developer in the Sc pole to the sleeve 114 of the developing roller 113.

In the region of the Sc pole, the developer supplied by the second mixer 118 is attached to the sleeve 114 of the developing roller 113 in a state where a magnetic brush is formed. In the region of the Sc pole, the blade 115 facing the sleeve 114 is disposed. In the region of the Sc pole, the blade 115 regulates the thickness of the layer of the developer attached to the sleeve 114 that rotates with the developing motor 111. In the region of the Sc pole, the developer having the regulated thickness that is carried by the sleeve 114 moves to the development position in the region of the Na pole.

A developing bias is applied to the developing roller 113. The surface potential of the sleeve 114 in the developing roller 113 is controlled by the developing bias. The toner in the developer carried by the sleeve 114 is attached to the electrostatic latent image depending on a potential difference between the surface potential of the sleeve 114 and the potential of the electrostatic latent image formed on the surface of the photoconductive drum 122. If the sleeve 114 rotates in the normal rotation direction, the developer carried by the sleeve 114 approaches the surface of the photoconductive drum 122 on which the electrostatic latent image is formed. The toner in the developer carried by the sleeve 114 develops the electrostatic latent image on the photoconductive drum 122 at the development position adjacent to the surface of the photoconductive drum 122. As a result, a toner image obtained by developing the electrostatic latent image with the toner is formed on the photoconductive drum 122.

The image (toner image) developed with the toner on the surface of the photoconductive drum 122 moves to a position corresponding to the primary transfer roller 128 together with the rotation of the photoconductive drum 122. The primary transfer roller 128 faces the photoconductive drum 122 with the intermediate transfer belt 21 interposed therebetween. The primary transfer roller 128 abuts against the surface of the photoconductive drum 122 with the intermediate transfer belt 21 interposed therebetween. The primary transfer roller 128 transfers the toner image on the surface of the photoconductive drum 122 to the intermediate transfer belt 21 (primary transfer).

The photoreceptor cleaner 130 is disposed downstream of a position on the intermediate transfer belt 21 to which the toner image on the surface of the photoconductive drum 122 is transferred in the circumferential direction of the photoconductive drum 122. The photoreceptor cleaner 130 removes the toner on the surface of the photoconductive drum 122. The photoreceptor cleaner 130 removes the toner remaining on the surface of the photoconductive drum 122 after the toner image is primarily transferred from the photoconductive drum 122 to the intermediate transfer belt 21.

The charge eraser 132 is disposed downstream of the position of the photoreceptor cleaner 130 in the circumferential direction of the photoconductive drum 122. The charge eraser 132 irradiates the surface of the photoconductive drum 122 with light. As a result, the charge eraser 132 erases charge remaining in the photoreceptor layer 124 on the surface of the photoconductive drum 122.

Next, a configuration of a control system in the digital multi-functional peripheral 1 as the image forming apparatus according to the embodiment will be described.

Figure 3:
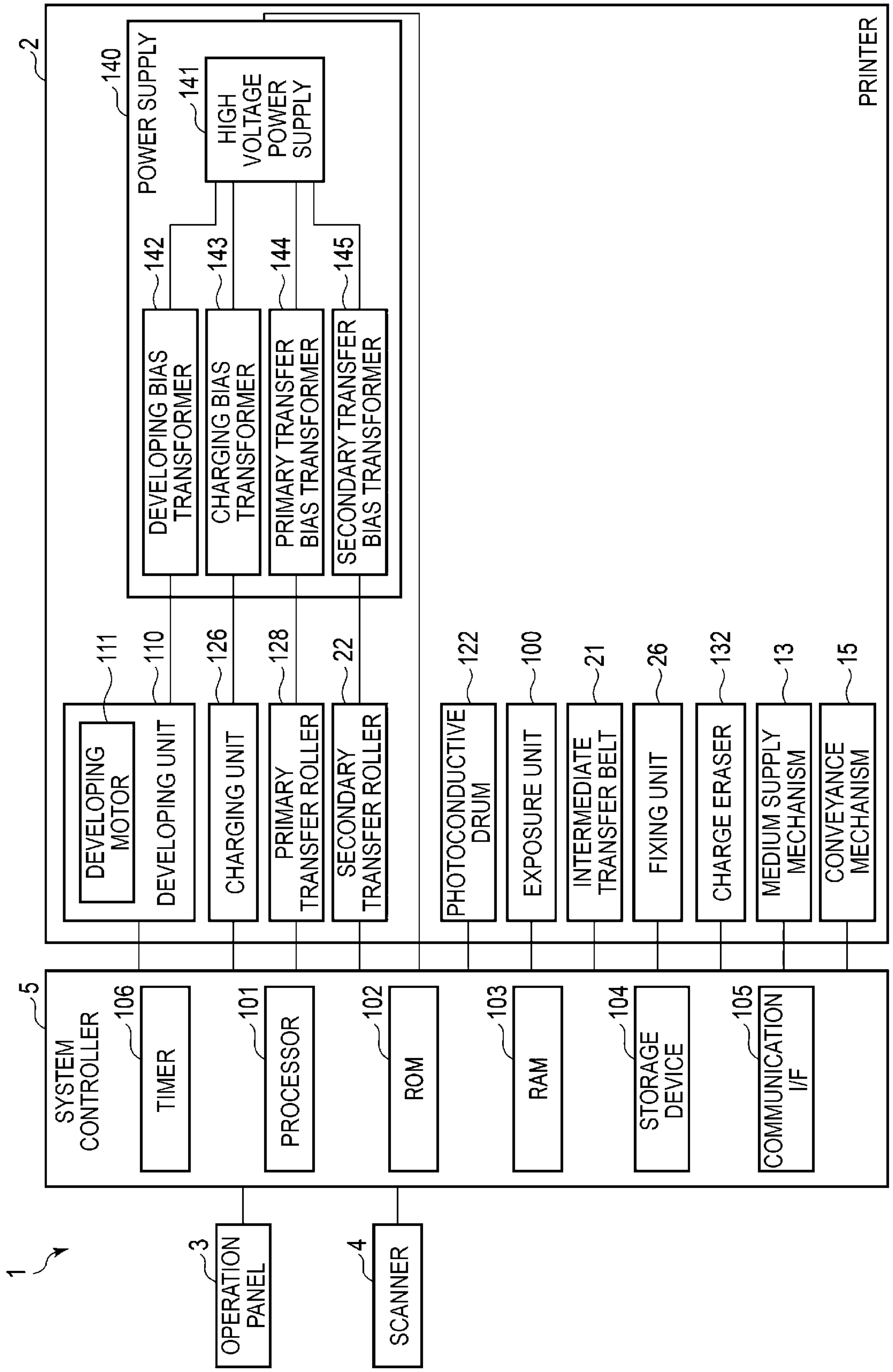
FIG. 3 is a block diagram illustrating a configuration example of a control system in the digital multi-functional peripheral as the image forming apparatus.

FIG. 3 is a block diagram illustrating a configuration example of a control system in the digital multi-functional peripheral 1 as the image forming apparatus according to the embodiment.

As illustrated in FIG. 3, the system controller 5 includes a processor 101, a ROM 102, a RAM 103, a storage device (memory) 104, a communication interface (I/F) 105, and a timer 106. In addition, the processor 101 of the system controller 5 is connected to each of the units in the digital multi-functional peripheral 1 via various interfaces.

The processor 101 executes various processes by executing programs. The processor 101 is, for example, a CPU. The processor 101 is connected to the ROM 102, the RAM 103, the storage device 104, the communication interface (I/F) 105, and the like. In addition, the processor 101 is connected to each of the units in the printer 2, the operation panel 3, and the scanner 4 via the interfaces.

The ROM 102 is a rewritable nonvolatile memory. The ROM 102 operates as a program memory that stores a program. The RAM 103 operates as a working memory or a buffer memory. The processor 101 executes various processes by executing the program stored in the ROM 102 or the storage device 104 using the RAM 103.

The storage device 104 is a rewritable nonvolatile memory. For example, the storage device 104 is configured with a hard disk drive (HDD) or a solid-state drive (SSD). The storage device 104 stores data such as control data, a control program, or setting information. The storage device 104 stores a period of time (reverse rotation time) for which the sleeve 114 rotates reversely with the developing motor 111 after the end of printing. In addition, the storage device 104 stores the control data and the like for setting the rotation speed of the sleeve 114 that rotates with the developing motor 111. Further, the storage device 104 may store image data or the like.

The communication I/F 105 is an interface for data communication with an external apparatus. For example, the communication I/F 105 communicates with a user terminal such as a PC or a mobile terminal via a network. The communication I/F 105 may input a print request (print job) of an image from a user terminal such as a PC.

The timer 106 tracks an elapsed time. The processor 101 measures an elapsed time using the timer 106 for various controls. For example, the processor 101 measures, for example, an elapsed time from the stop of the developing motor 111 or an elapsed time from the reverse rotation of the sleeve by the developing motor 111 using the timer 106.

As illustrated in FIG. 3, the printer 2 includes a power supply 140 in addition to various configurations illustrated in FIGS. 1 and 2.

The power supply 140 supplies operating power to each of the driving mechanisms such as the developing unit 110, the charging unit 126, the primary transfer roller 128, and the secondary transfer roller 22. For example, the power supply 140 supplies driving power to the developing motor 111 that rotates the developing roller 113 in the developing unit 110. The processor 101 of the controller 5 controls the operation of the developing motor 111 that is driven by the power from the power supply 140. The processor 101 controls the developing motor 111 to be turned on and off and controls the rotation direction and the rotation speed of the developing roller 113 rotating with the developing motor 111.

In addition, as illustrated in FIG. 3, the power supply 140 includes a high voltage power supply 141, a developing bias transformer 142, a charging bias transformer 143, a primary transfer bias transformer 144, and a secondary transfer bias transformer 145. The developing bias transformer 142, the charging bias transformer 143, and the primary transfer bias transformer 144 are provided for each of the image forming stations SY, SM, SC, and SK.

The high voltage power supply 141 supplies high voltage to various transformers 142, 143, 144, and 145. The high voltage refers to, for example, a voltage of several hundreds V to several kV. The high voltage power supply 141 generates, for example, the high voltage from an input voltage of several tens V.

The developing bias transformer 142 supplies a developing bias voltage to the developing unit 110. The developing bias transformer 142 transforms the high voltage generated from the high voltage power supply 141 into a developing bias voltage having a voltage value set by the system controller 5. The developing bias transformer 142 supplies a developing bias voltage designated by the system controller 5 to the developing unit 110.

The charging bias transformer 143 supplies a charging bias voltage to the charging unit 126. The charging bias transformer 143 transforms the high voltage generated from the high voltage power supply 141 into a charging bias voltage having a voltage value set by the system controller 5. The charging bias transformer 143 supplies a charging bias voltage designated by the system controller 5 to the charging unit 126.

The primary transfer bias transformer 144 supplies a primary transfer bias voltage to the primary transfer roller 128. The primary transfer bias transformer 144 transforms the high voltage generated from the high voltage power supply 141 into a primary transfer bias voltage having a voltage value set by the system controller 5. The primary transfer bias transformer 144 supplies a primary transfer bias voltage designated by the system controller 5 to the primary transfer roller 128.

The secondary transfer bias transformer 145 supplies a secondary transfer bias voltage to the secondary transfer roller 22. The secondary transfer bias transformer 145 transforms the high voltage generated from the high voltage power supply 141 into a secondary transfer bias voltage having a voltage value set by the system controller 5. The secondary transfer bias transformer 145 supplies a secondary transfer bias voltage designated by the system controller 5 to the secondary transfer roller 22.

Next, an operation of an image forming process (printing) in the printer 2 as the image forming apparatus according to the embodiment will be described.

The digital multi-functional peripheral 1 executes the image forming process of acquiring an image to be formed on the recording medium M and printing the acquired image on the recording medium M with the printer 2. For example, if copying is instructed by the operation panel 3, the processor 101 of the system controller 5 executes a process of printing an image of a document read by the scanner 4 on the recording medium M with the printer 2.

If the image forming process is executed, the processor 101 of the system controller 5 causes the medium supply mechanism 13 to take in the recording medium M that is accommodated in an accommodation unit. The processor 101 causes the conveyance mechanism 15 to convey the recording medium M supplied from the medium supply mechanism 13 in the printer 2 to the front of the registration roller 56.

In addition, the processor 101 of the system controller 5 generates an image that is formed by each of the image forming stations SY, SM, SC, and SK based on the image (print image) to be printed on the recording medium M. For example, the processor 101 generates the color images (yellow, magenta, cyan, and black) that is formed by the image forming stations SY, SM, SC, and SK based on the print image. If the color images are generated based on the print image, the processor 101 causes the image forming stations to form the generated color images.

In each of the image forming stations SY, SM, SC, and SK, the charging unit 126 charges the photoreceptor layer 124 of the photoconductive drum 122 with the charging bias voltage from the charging bias transformer 143. The exposure unit 100 irradiates the photoconductive drum 122 of each of the image forming stations SY, SM, SC, and SK with light for forming the electrostatic latent image corresponding to each of the color images. In each of the image forming stations SY, SM, SC, and SK, the electrostatic latent image is formed on the photoreceptor layer 124 of the photoconductive drum 122 by the light emitted from the exposure unit 100.

Each of the image forming stations SY, SM, SC, and SK develops the electrostatic latent image on the photoconductive drum 122 with the color toner in the developing unit 110. In each of the image forming stations SY, SM, SC, and SK, the developing roller 113 rotates while carrying the developer including each of the color toners supplied from the developer container 112. The developing bias voltage from the developing bias transformer 142 is applied to the developing roller 113 that carries the developer. The developing unit 110 supplies the toner in the developer carried by the developing roller 113 to the electrostatic latent image due to the potential difference (contrast potential) between the potential of the developing roller 113 and the potential of the electrostatic latent image of the photoconductive drum 122.

In each of the image forming stations SY, SM, SC, and SK, the photoconductive drum 122 moves the image (toner image) developed by the developing unit 110 to the position (primary transfer position) facing the primary transfer roller 128. At the primary transfer position, the photoconductive drum 122 faces the primary transfer roller 128 with the intermediate transfer belt 21 interposed therebetween. The primary transfer bias voltage from the primary transfer bias transformer 144 is applied to the primary transfer roller 128. The toner image on the photoconductive drum 122 is transferred to the intermediate transfer belt 21 by the primary transfer roller to which the primary transfer bias voltage is applied at the primary transfer position. If the color image is formed, the image forming stations SY, SM, SC, and SK transfer and layer the color toner images to and on the intermediate transfer belt 21. As a result, the color image obtained by layering the color toner images is transferred to the intermediate transfer belt 21.

The intermediate transfer belt 21 moves the transferred toner image to the position (secondary transfer position) facing the secondary transfer roller 22. The registration roller 56 conveys the recording medium M to the secondary transfer position at a timing corresponding to the position of the image transferred to the intermediate transfer belt 21. As a result, the intermediate transfer belt 21 and the recording medium M that overlap each other are conveyed in a state where they are interposed between the secondary transfer roller 22 and the support roller 23 at the secondary transfer position. The secondary transfer bias voltage from the secondary transfer bias transformer 145 is applied to the secondary transfer roller 22. The toner image on the intermediate transfer belt 21 is transferred to the recording medium M by the secondary transfer roller 22 to which the secondary transfer bias voltage is applied at the secondary transfer position.

The recording medium M that passes the secondary transfer position is conveyed to the fixing unit 26. The fixing unit 26 fixes the toner image that is transferred from the intermediate transfer belt 21 to the recording medium M at the secondary transfer position to the recording medium M. The fixing unit 26 applies heat and pressure to the recording medium M to which the toner image is transferred to fix the toner image to the recording medium M. The recording medium M that passes the fixing unit 26 is discharged from the paper discharge unit in a state where the toner image is fixed.

Next, a configuration example of the plurality of magnetic poles disposed in the developing roller 113 of the digital multi-functional peripheral 1 as the image forming apparatus according to the embodiment will be described.

Figure 4:
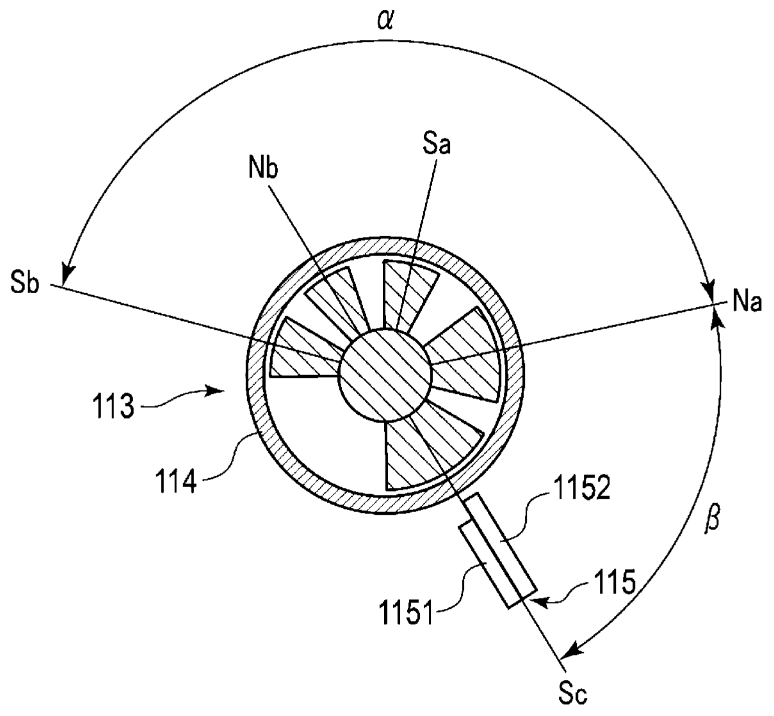
FIG. 4 is a diagram illustrating a configuration example of a developing roller in the digital multi-functional peripheral as the image forming apparatus.

FIG. 4 is a diagram illustrating a configuration example of the plurality of magnetic poles that are disposed on the developing roller 113 in the digital multi-functional peripheral 1 as the image forming apparatus according to the embodiment.

As illustrated in FIG. 2, the developing roller 113 illustrated in FIG. 4 has the configuration in which the Na pole, the Sa pole, the Nb pole, the Sb pole, and the Sc pole are disposed in this order in the normal rotation direction. The Na pole supplies the developer carried by the sleeve 114 to the electrostatic latent image of the photoconductive drum 122. The Sc pole causes the developer to adsorb to the sleeve 114. The Sb pole causes the developer to peel off from the sleeve 114 due to a repulsive magnetic force (peel force) generated between the Sb pole and the Sc pole and a centrifugal force by the rotation of the sleeve. A region from the pole position of the Sb pole to a region of the Sc pole is configured to be a region (peel-off region) where the developer is peeled off from the sleeve 114.

Here, the position (pole position) of each of the magnetic poles is defined by a normal line that passes through a middle point connecting two points where a normal magnetic force in the sleeve 114 is a predetermined intensity (for example, 80% of a maximum value). In the developing roller 113, the magnetic poles are disposed such that a position relationship between the normal lines representing the pole positions of the plurality of magnetic poles is a predetermined designed value. The developing roller 113 is disposed such that the surface of the sleeve 114 is most adjacent to the photoconductive drum 122 at the pole position of the Na pole. In addition, the blade 115 is disposed such that a position facing the surface of the sleeve 114 of the developing roller 113 is the pole position of the Sc pole.

In the example illustrated in FIG. 4, an angle $\alpha$ refers to an angle between the facing position of the blade 115 and the pole position of the Na pole, and an angle $\beta$ refers to an angle between the position of the Na pole and the position of the Sb pole. In the example illustrated in FIG. 4, the designed value of the angle $\alpha$ between the facing position of the blade 115 and the pole position of the Na pole is 72.5°. The designed value of the angle $\beta$ between the Na pole and the Sb pole is 149°±3°. A tolerance for the adjustment of the pole positions is set as 1°.

A rotation angle (referred to as "reverse rotation angle") at which the surface of the sleeve 114 rotates reversely from the pole position of the Sb pole to the facing position of the blade 115 is an angle obtained by adding the angle $\alpha$ and the angle $\beta$ to each other. According to the designed values, the reverse rotation angle is 72.5°+149°+3°+1°=225.5°. That is, in order to reverse the surface of the sleeve 114 reversely from the peel-off region of the developer to the facing position of the blade 115, the sleeve 114 may rotate reversely by 222.5°.

Next, if the sleeve 114 of the developing roller 113 in the digital multi-functional peripheral 1 as the image forming apparatus according to the embodiment rotates reversely, a state of the developer will be described.

Figure 5:
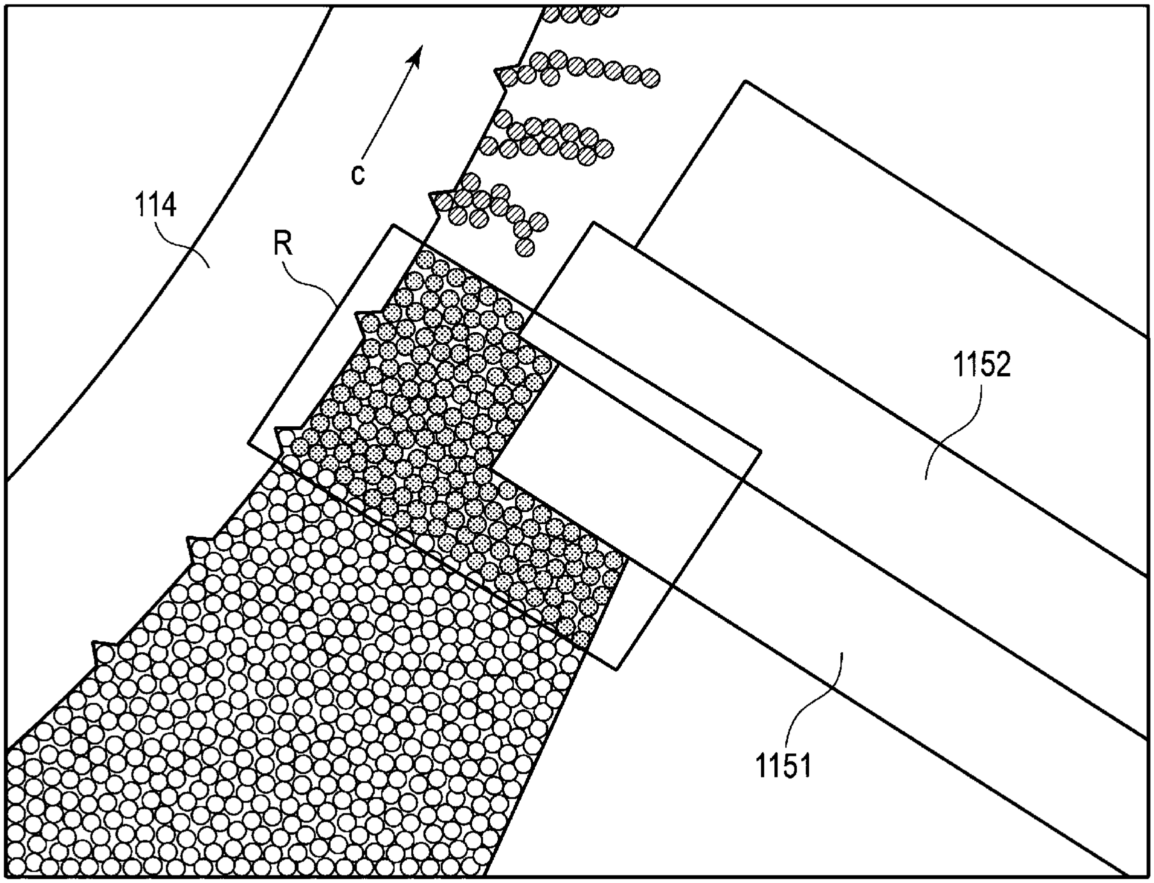
FIG. 5 is a diagram illustrating a state of toner in the developing unit if the developing roller in the digital multi-functional peripheral as the image forming apparatus rotates normally.
Figure 6:
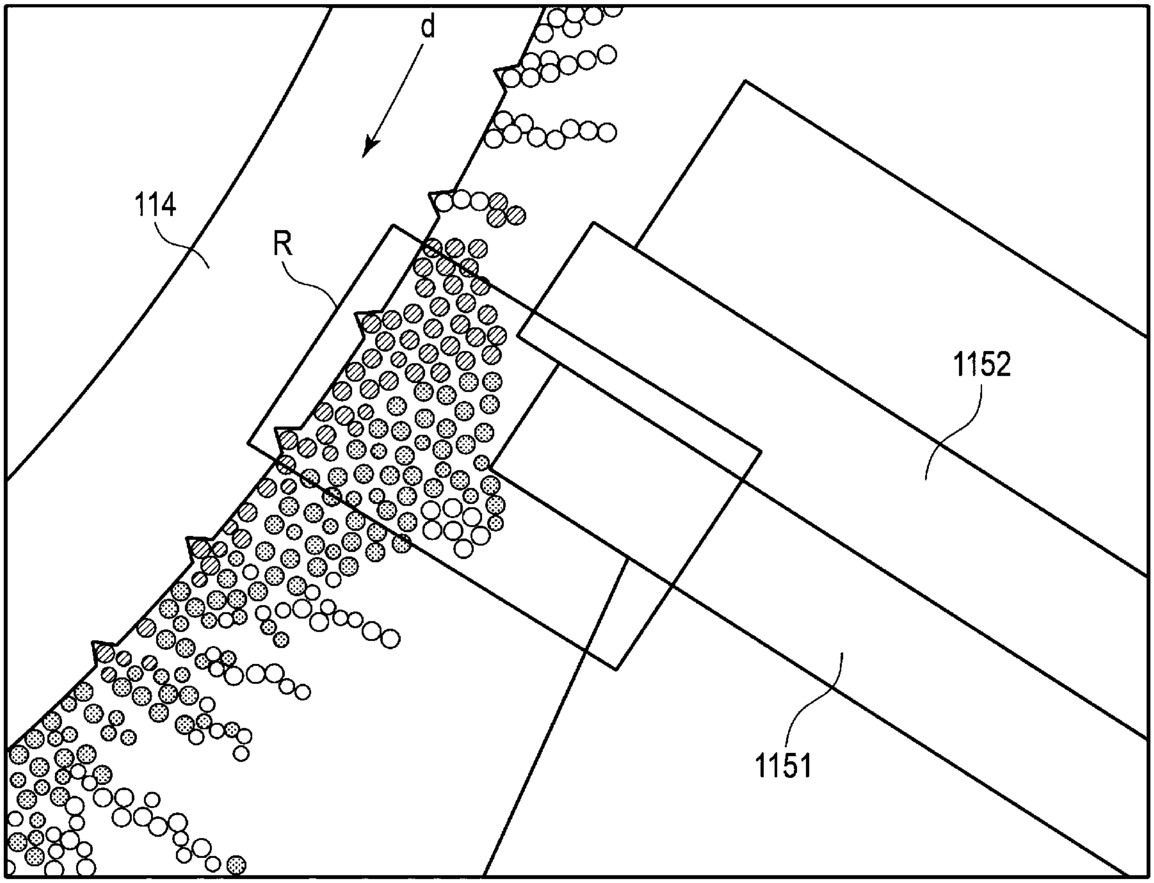
FIG. 6 is a diagram illustrating a state of toner in the developing unit if the developing roller in the digital multi-functional peripheral as the image forming apparatus rotates reversely.

FIG. 5 is a diagram illustrating a state of the developer in the developing unit 110 if the sleeve 114 in the digital multi-functional peripheral as the image forming apparatus according to the embodiment rotates normally. FIG. 6 is a diagram illustrating a state of the developer in the developing unit 110 if the sleeve 114 in the digital multi-functional peripheral 1 as the image forming apparatus according to the embodiment rotates reversely.

The example illustrated in FIG. 5 represents the state where the sleeve 114 is rotated (normal rotation) in the normal rotation direction (the arrow c direction in the drawing). As illustrated in FIG. 5, if the sleeve 114 is rotated normally (during the printing operation), the developer is present at a high density in a gap where the surface of the sleeve 114 and the blade 115 face each other. In addition, if sleeve 114 is rotated normally (during the printing operation), the developer is also present at a high density in the front of the blade 115 in the normal rotation direction.

Further, if the sleeve 114 is rotated normally (during the printing operation), the developer is also present at a high density in a step difference portion between the paramagnetic material 1151 and the non-magnetic material 1152 forming the blade 115. The blade 115 has the configuration in which the paramagnetic material 1151 is disposed more distant than the non-magnetic material 1152 such that stress on the developer is reduced. On the other hand, the developer is more likely to remain in the step difference formed by the configuration of the blade 115 in which the paramagnetic material 1151 is disposed more distant than the non-magnetic material 1152.

The example illustrated in FIG. 6 represents the state where the sleeve 114 is rotated (reverse rotation) in a reverse rotation direction (an arrow d direction in FIG. 6 opposite to the arrow c). As illustrated in FIG. 6, the developer present in the vicinity of the blade 115 moves to the developer container 112 side due to the reverse rotation of the sleeve 114. In this case, the developer that is closer to the Na pole side than the blade 115 flows into the gap between the sleeve 114 and the blade 115 due to the reverse rotation of the sleeve 114. As a result, the developer in the vicinity of the blade 115 is replaced by the reverse rotation of the sleeve 114.

Figure 7:
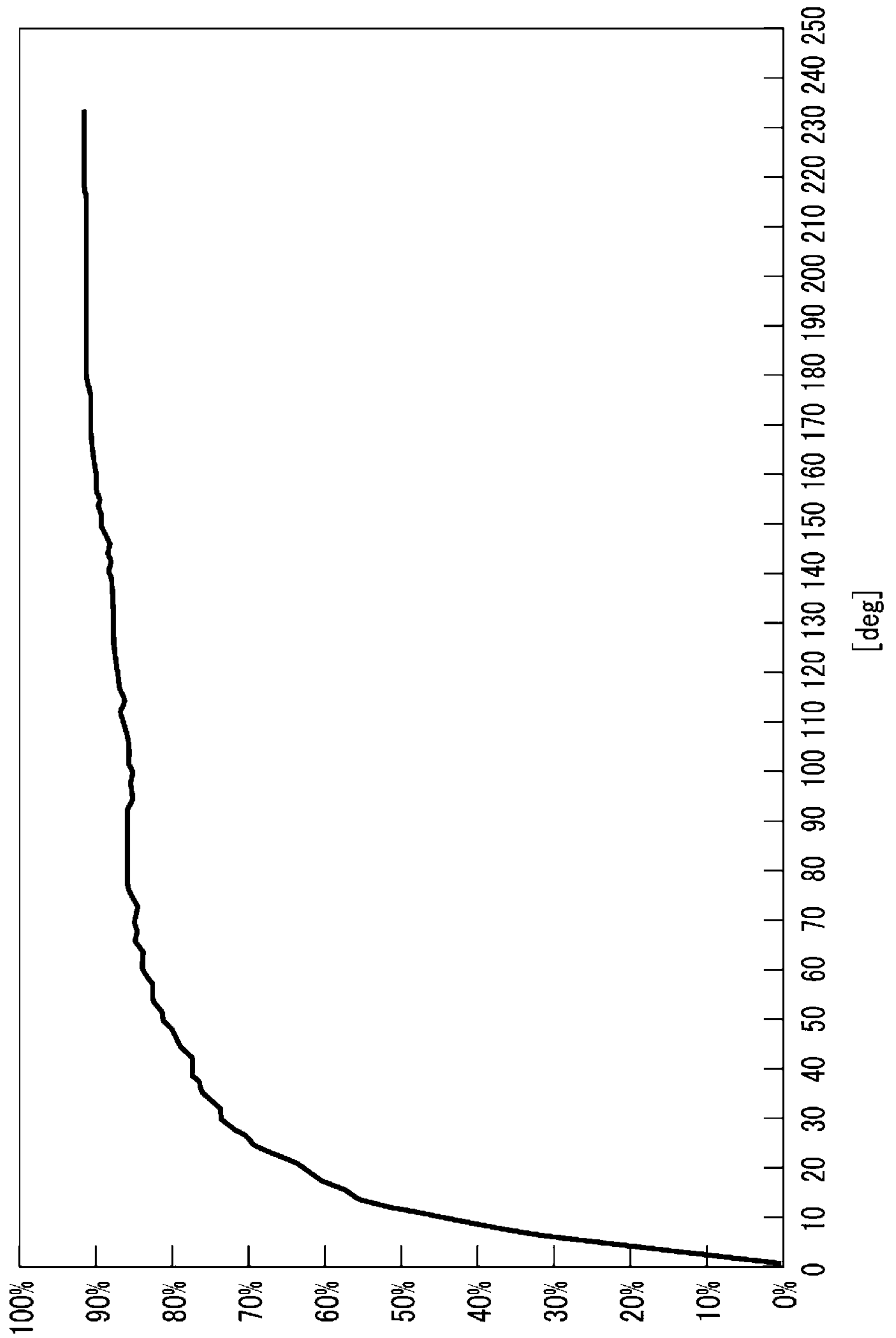
FIG. 7 is a diagram illustrating an example of measuring the amount of toner remaining around in a blade if the developing roller in the digital multi-functional peripheral as the image forming apparatus rotates reversely.

FIG. 7 is a diagram illustrating an example of measuring the amount of the developer remaining around in the blade 115 if the sleeve 114 in the digital multi-functional peripheral 1 as the image forming apparatus according to the embodiment is rotated reversely.

The graph illustrated in FIG. 7 represents a relationship between the rotation angle by which the sleeve 114 is rotated reversely and the replacement ratio of the developer in a designated region R illustrated in FIGS. 5 and 6. In the graph illustrated in FIG. 7, the horizontal axis represents the reverse rotation angle (amount of reverse rotation) of the sleeve, and the vertical axis represents the replacement ratio of the developer in the designated region R.

The graph illustrated in FIG. 7 represents that the replacement ratio of the developer in the designated region R set around a tip of the blade 115 is "0" before the reverse rotation of the sleeve 114. In the graph illustrated in FIG. 7, if the reverse rotation angle of the sleeve 114 is 70 deg, the replacement ratio of the developer is 85.6%. According to this result, if the sleeve 114 is rotated reversely by 70 deg, the designated region represents that 85.6% of the developer is replaced. Further, in the graph illustrated in FIG. 7, if the reverse rotation angle of the sleeve 114 is 225 deg, the replacement ratio of the developer is 92.3%. According to this result, if the sleeve 114 is rotated reversely by 225 deg, the designated region represents that 92.5% of the developer is replaced.

Here, if the developing roller 113 has the arrangement of the magnetic poles illustrated in FIG. 4, the sleeve 114 acts not to carry the developer in the region from the Sb pole to the Sc pole. Therefore, even if the sleeve 114 rotates reversely to pass the Sb pole, it is difficult to reduce the developer in the vicinity of the blade 115.

FIG. 7 illustrates the result of the measurement using the developing roller 113 having the configuration illustrated in FIG. 4. According to the designed values, in the configuration example illustrated in FIG. 4, the reverse rotation angle is 225.5°. According to the measurement result illustrated in FIG. 7, even if the reverse rotation angle is 225.5° or more, the replacement ratio of the developer does not substantially increase. Accordingly, it is clarified from the measurement result illustrated in FIG. 7 that, even if the sleeve 114 is rotated reversely by more than 225.5°, there is no effect of reducing the developer.

If a decrease in the developer in the vicinity of the blade 115 is not expected, the reverse rotation of the sleeve 114 passing the Sb pole is meaningless driving. The meaningless driving may cause not only consumption of unnecessary energy but also promotion of deterioration of consumables by an increase in driving time. Accordingly, the controller 5 of the digital multi-functional peripheral 1 executes a control such that the surface of the sleeve 114 rotates reversely from the pole position of the Sb pole to the facing position of the blade 115 after the end of printing.

In addition, the controller 5 executes the control of rotating the sleeve 114 reversely based on the driving time (reverse rotation time) for which the developing motor 111 rotates reversely. The reverse rotation time refers to a period of time required until the sleeve 114 is rotated reversely by the reverse rotation angle after the end of printing. In the digital multi-functional peripheral 1 according to the embodiment, it is noted that a speed (reverse rotation speed) at which the sleeve 114 rotates reversely after the end of printing is a preset speed.

For example, the controller 5 sets, as the reverse rotation speed, the lowest speed at which the developing motor 111 rotates the sleeve 114 reversely in the image forming process. If the reverse rotation speed is determined, the reverse rotation time is set based on the desired reverse rotation angle (in the above-described example, 225.5°). The reverse rotation time is stored in the storage device 104 as a set value used for the control of rotating the developing motor 111 reversely after the end of printing. The controller 5 rotates the sleeve 114 reversely at the reverse rotation speed for the reverse rotation time stored in the storage device 104 after the end of printing.

Next, an operation of the developing unit 110 after the end of printing in the digital multi-functional peripheral 1 as the image forming apparatus according to the embodiment will be described.

Figure 8:
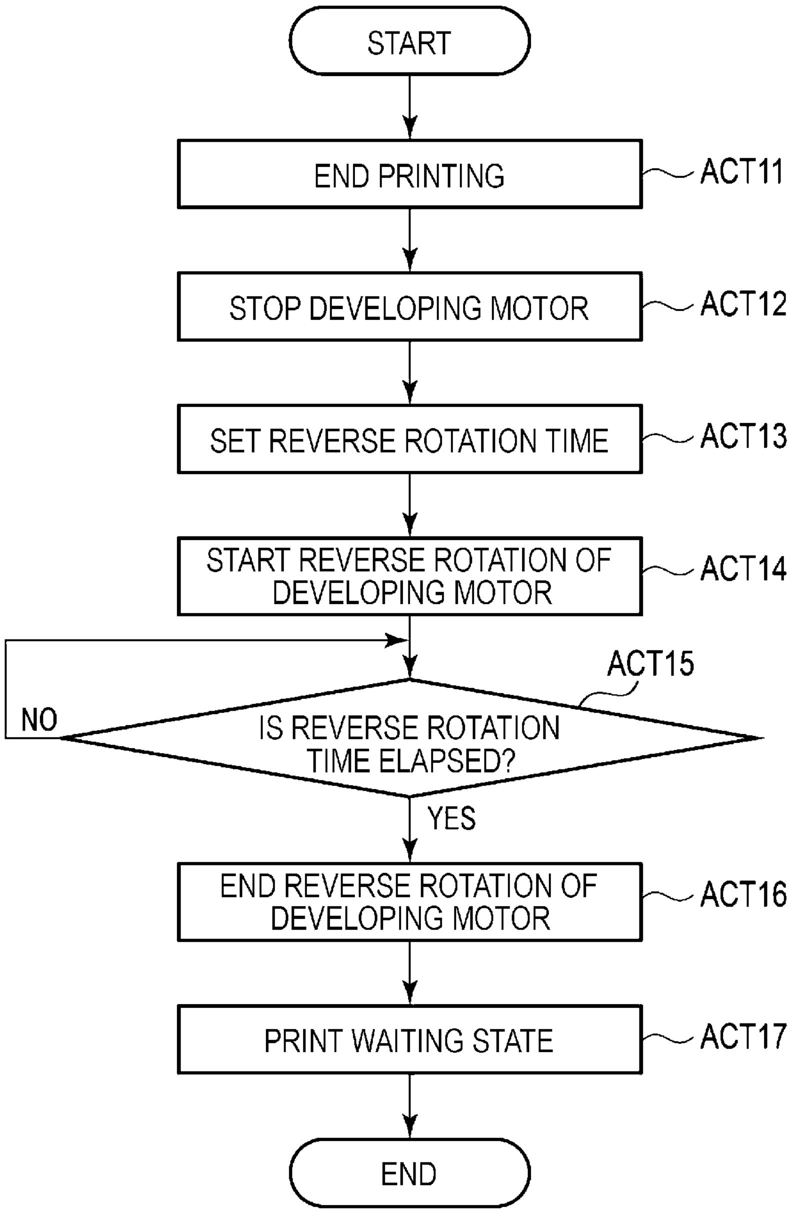
FIG. 8 is a flowchart illustrating an operation example of a control of rotating the developing roller reversely if the printing of the digital multi-functional peripheral as the image forming apparatus ends.

FIG. 8 is a flowchart illustrating an example of an operation control on the developing unit 110 after the end of printing in the digital multi-functional peripheral 1 as the image forming apparatus according to the embodiment.

If the end of the image forming process by the printer 2 is detected (ACT 11), the processor 101 of the system controller 5 stops the operation of the developing motor 111 (ACT 12). The processor 101 sets the developing motor 111 in the stopped state for a stop time (break time (for example, 400 ms)) set as the specification of the developing motor 111. For example, the processor 101 causes the timer 106 to track an elapsed time from the stop of the developing motor 111.

In addition the processor 101 acquires the reverse rotation time of the developing motor 111 stored in the storage device 104 (ACT 13). The reverse rotation time refers to a period of time required until the surface of the sleeve 114 present in the Sb pole rotates up to the facing position facing the blade 115. In addition, the processor 101 sets a preset speed as the speed at which the sleeve 114 rotates reversely with the developing motor 111.

If the reverse rotation time is acquired from the storage device 104, the processor 101 starts the reverse rotation of the sleeve 114 by rotating the developing motor 111 reversely at the reverse rotation speed (ACT 14). The processor 101 causes the timer 106 to track an elapsed time from the start of the reverse rotation of the sleeve 114. The processor 101 monitors whether or not the elapsed time tracked by the timer 106 reaches the reverse rotation time (ACT 15).

If the elapsed time tracked by the timer 106 reaches the reverse rotation time (ACT 15, YES), the processor 101 stops the reverse rotation of the developing motor 111 (ACT 16). The processor 101 ends the operation of the developing unit 110 after the end of printing by stopping the reverse rotation of the developing motor 111, and enters a print waiting state (ACT 17).

As described above, in the digital multi-functional peripheral according to the embodiment, the surface of the sleeve present in the peel-off region of the developer at the end of printing rotates reversely up to the facing position of the blade. As a result, in the image forming apparatus according to the embodiment, contact between the blade and the developer for a long period of time can be suppressed.

As a result, even if the temperature of the blade during the printing operation increases, contact between a large amount of the developer and the blade is not maintained after the end of printing. Therefore, the caking of the developer can be suppressed. In addition, even if the temperature of the blade increases due to a heater for preventing dew condensation in a print waiting state, the amount of the developer in contact with the blade in the print waiting state is small. Therefore, the caking of the developer can be suppressed. Further, even if the developer is toner having a low melting point, contact between the developer and the blade for a long period of time is not maintained. Therefore, the caking of the developer can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:

a developing roller including a sleeve configured to carry a developer supplied to an electrostatic latent image held by an image carrier;

a developing motor configured to rotate the sleeve in any one of a first direction or a second direction opposite to the first direction;

a blade configured to regulate a thickness of a layer of the developer carried by the sleeve rotating in the first direction with the developing motor;

a controller configured to rotate the sleeve in the second direction with the developing motor until a surface of the sleeve present in a peel-off region of the developer arrives at a facing position facing the blade after development on the electrostatic latent image held by the image carrier ends, wherein a peel-off magnetic pole that generates a peel force to peel the developer from the sleeve is disposed in the developing roller, and wherein the controller rotates the sleeve in the second direction with the developing motor until the surface of the sleeve present at a position of the peel-off magnetic pole arrives at the facing position after the development on the electrostatic latent image held by the image carrier ends;

a memory configured to store, if the sleeve rotates in the second direction at a predetermined speed, a reverse rotation time required until the surface of the sleeve arrives at the facing position from the position of the peel-off magnetic pole, wherein the controller rotates the sleeve in the second direction at the predetermined speed for the reverse rotation time after the development on the electrostatic latent image formed on the image carrier ends; and the memory configured to store, if the sleeve rotates in the second direction at a second predetermined speed, a second reverse rotation time required until the surface of the sleeve present in the peel-off region of the developer arrives at the facing position facing the blade, wherein the controller rotates the sleeve in the second direction at the second predetermined speed for the second reverse rotation time after the development on the electrostatic latent image formed on the image carrier ends.

2. The image forming apparatus according to claim 1, wherein the peel-off magnetic pole is disposed at a region of the sleeve wherein a gap, caused by a repulsive force of the peel-off magnetic pole acting at the region, is disposed between developer remaining at the sleeve and the blade.

3. The image forming apparatus according to claim 2, wherein the blade is formed of a paramagnetic material and a non-magnetic material, and wherein the paramagnetic material at the facing position is disposed more distant from the surface of the sleeve than the non-magnetic material.

4. The image forming apparatus according to claim 1, wherein the blade is formed of a paramagnetic material and a non-magnetic material, and wherein the paramagnetic material at the facing position is disposed more distant from the surface of the sleeve than the non-magnetic material.

5. The image forming apparatus according to claim 1, wherein the blade is formed of a paramagnetic material and a non-magnetic material, and wherein the paramagnetic material at the facing position is disposed more distant from the surface of the sleeve than the non-magnetic material.

6. The image forming apparatus according to claim 1, wherein a region of the sleeve circumferentially spaced from the peel-off magnetic pole includes a unipolar magnetic pole that forms the layer of the developer carried by the sleeve after causing the sleeve to adsorb to the developer, is disposed.

7. The image forming apparatus according to claim 1, wherein a region of the sleeve circumferentially spaced from the peel-off magnetic pole includes a unipolar magnetic pole that forms the layer of the developer carried by the sleeve after causing the sleeve to adsorb to the developer is disposed.

8. A method for an image forming apparatus, comprising:

supplying a developer carried by a developing roller including a sleeve to an electrostatic latent image held by an image carrier;

rotating the sleeve in any one of a first direction or a second direction opposite to the first direction with a developing motor;

regulating a thickness of a layer of the developer carried by the sleeve rotating in the first direction using a blade;

rotating the sleeve in the second direction until a surface of the sleeve present in a peel-off region of the developer arrives at a facing position facing the blade after development on the electrostatic latent image held by the image carrier ends;

generating a peel force with a peel-off magnetic pole to peel the developer from the sleeve;

rotating the sleeve in the second direction with the developing motor until the surface of the sleeve present at a position of the peel-off magnetic pole arrives at the facing position after the development on the electrostatic latent image held by the image carrier ends;

storing, for a case where the sleeve rotates in the second direction at a predetermined speed, a reverse rotation time required until the surface of the sleeve arrives at the facing position from the position of the peel-off magnetic pole;

rotating the sleeve in the second direction at the predetermined speed for the reverse rotation time after the development on the electrostatic latent image formed on the image carrier ends;

storing, for a second case where the sleeve rotates in the second direction at a second predetermined speed, a second reverse rotation time required until the surface of the sleeve present in the peel-off region of the developer arrives at the facing position facing the blade; and rotating the sleeve in the second direction at the second predetermined speed for the second reverse rotation time after the development on the electrostatic latent image formed on the image carrier ends.

9. The method according to claim 8, further comprising:

wherein the peel-off magnetic pole is disposed at a region of the sleeve.

10. A developing device, comprising:

a developing roller including a sleeve configured to carry a developer supplied to an electrostatic latent image held by an image carrier;

a developing motor configured to rotate the sleeve in any one of a first direction or a second direction opposite to the first direction;

a blade configured to regulate a thickness of a layer of the developer carried by the sleeve rotating in the first direction with the developing motor;

a controller configured to rotate the sleeve in the second direction with the developing motor until a surface of the sleeve present in a peel-off region of the developer arrives at a facing position facing the blade after development on the electrostatic latent image held by the image carrier ends, wherein a peel force is generated at the peel-off region to peel the developer from the sleeve;

a memory configured to store, if the sleeve rotates in the second direction at a predetermined speed, a reverse rotation time required until the surface of the sleeve present in the peel-off region of the developer arrives at the facing position facing the blade, wherein the controller rotates the sleeve in the second direction at the predetermined speed for the reverse rotation time after the development on the electrostatic latent image formed on the image carrier ends; and the memory configured to store, if the sleeve rotates in the second direction at a second predetermined speed, a second reverse rotation time required until the surface of the sleeve present in the peel-off region of the developer arrives at the facing position facing the blade, wherein the controller rotates the sleeve in the second direction at the second predetermined speed for the second reverse rotation time after the development on the electrostatic latent image formed on the image carrier ends.

11. The developing device according to claim 10, wherein the blade is formed of a paramagnetic material and a non-magnetic material, and wherein the paramagnetic material at the facing position is disposed more distant from the surface of the sleeve than the non-magnetic material.

12. The developing device according to claim 10, wherein the blade is formed of a paramagnetic material and a non-magnetic material, and wherein the paramagnetic material at the facing position is disposed more distant from the surface of the sleeve than the non-magnetic material.

13. The developing device according to claim 10, wherein a peel-off magnetic pole is disposed at a circumferential region of the sleeve, being the peel-off region, which is disposed circumferentially between a pair of other poles having charges opposed to a repulsive charge of the peel-off magnetic pole.

14. The developing device according to claim 10, wherein in another region of the sleeve circumferentially spaced from the peel-off region includes a unipolar magnetic pole, that forms the layer of the developer carried by the sleeve after causing the sleeve to adsorb to the developer, is disposed.

15. The developing device according to claim 10, wherein the sleeve is caused by the controller to rotate to the peel-off position of the sleeve wherein a radially-extending gap, caused by a repulsive force of a peel-off magnetic pole acting at the peel-off position, is disposed between developer remaining at the sleeve and the blade.

* * * * *